United States Patent

[11] 3,623,021

[72] Inventors Lawrence B. Haskin
Liverpool;
Samuel M. Korzekwa, Baldwinsville, both of N.Y.
[21] Appl. No. 885,134
[22] Filed Dec. 15, 1969
[45] Patented Nov. 23, 1971
[73] Assignee The United States of America as represented by the Secretary of the Navy

[54] DIGITAL WEIGHTING MULTIPLEXER WITH MEMORY
2 Claims, 4 Drawing Figs.

[52] U.S. Cl. .......... 340/172.5
[51] Int. Cl. .......... H04j 7/00
[50] Field of Search .......... 340/172.5

[56] References Cited

UNITED STATES PATENTS

| | | | |
|---|---|---|---|
| 3,267,431 | 8/1966 | Greenberg et al. | 340/172.5 X |
| 3,316,540 | 4/1967 | Nissim | 340/172.5 |
| 3,370,276 | 2/1968 | Schell | 340/172.5 |
| 3,400,370 | 9/1968 | Fukamachi | 340/172.5 |
| 3,503,047 | 3/1970 | Schaepman | 340/172.5 |
| 3,518,633 | 6/1970 | Croy | 340/172.5 |

*Primary Examiner*—Paul J. Henon
*Assistant Examiner*—Ronald F. Chapuran
*Attorneys*—E. J. Brower and J. M. St. Amand

ABSTRACT: A system which offers a new and improved technique in the realm of multiplexing operations having the capability of scanning large numbers of digital inputs, assigning weights of importance to these inputs and storing the weighted sum in a memory. The present technique is especially signficant in that it is a completely digital operation, eliminating the need for strict specifications on such input parameters as pulse length and amplitude, and it permits the processed result to be stored indefinitely in a counter or until the information is needed.

LAWRENCE B. HASKIN
SAMUEL M. KORZEKWA
*INVENTORS*

BY J. M. St. Amand

*ATTORNEY*

LAWRENCE B. HASKIN
SAMUEL M. KORZEKWA
INVENTORS

BY J. M. St. Amand
ATTORNEY

DIGITAL WEIGHTING MULTIPLEXER WITH MEMORY

The invention herein described may be manufactured and used by or for the Government of the United States of America for governmental purposes without the payment of any royalties thereon or therefor.

This invention is related to improvements in multiplexing operation.

There are many methods of performing multiplexing operations. However, when a system also assigns relative weights of importance to the scanned inputs and cumulatively records their occurrence, some sort of analog technique is normally employed. Such a system is illustrated in FIG. 1 where by examining the expression for the output voltage, $e_o$, it can be seen that the system has effectively scanned, weighted, and summed the inputs $x_1$, $x_2$, $x_3$. The integration operation provides a measure of the relative occurrence of the various inputs over a time interval. However, tight restrictions must be placed on the amplitudes and durations of the inputs if the weighting factor is to be the only significant factor.

The multiplexer of the present invention scans, weights, and sums a large number of inputs in a completely digital operation. The effects of variations in the input amplitudes and pulse lengths are eliminated and the system capacity, scanning speed and cycle time are fairly easily changed. An indefinite memory is retained with a digital counter after cycle operation and the form of memory readout is flexible.

Other objects and many of the attendant advantages of this invention will become readily appreciated as the same becomes better understood by reference to the following detailed description when considered in connection with the accompanying drawings wherein.

Figure 1:
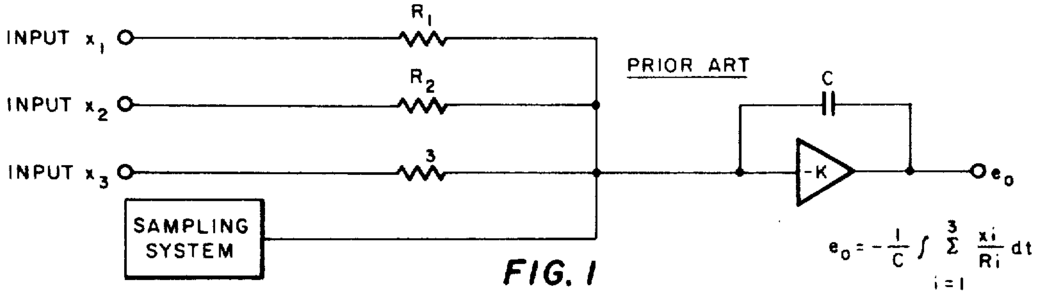
FIG. 1 shows a prior art system.
Figure 2:
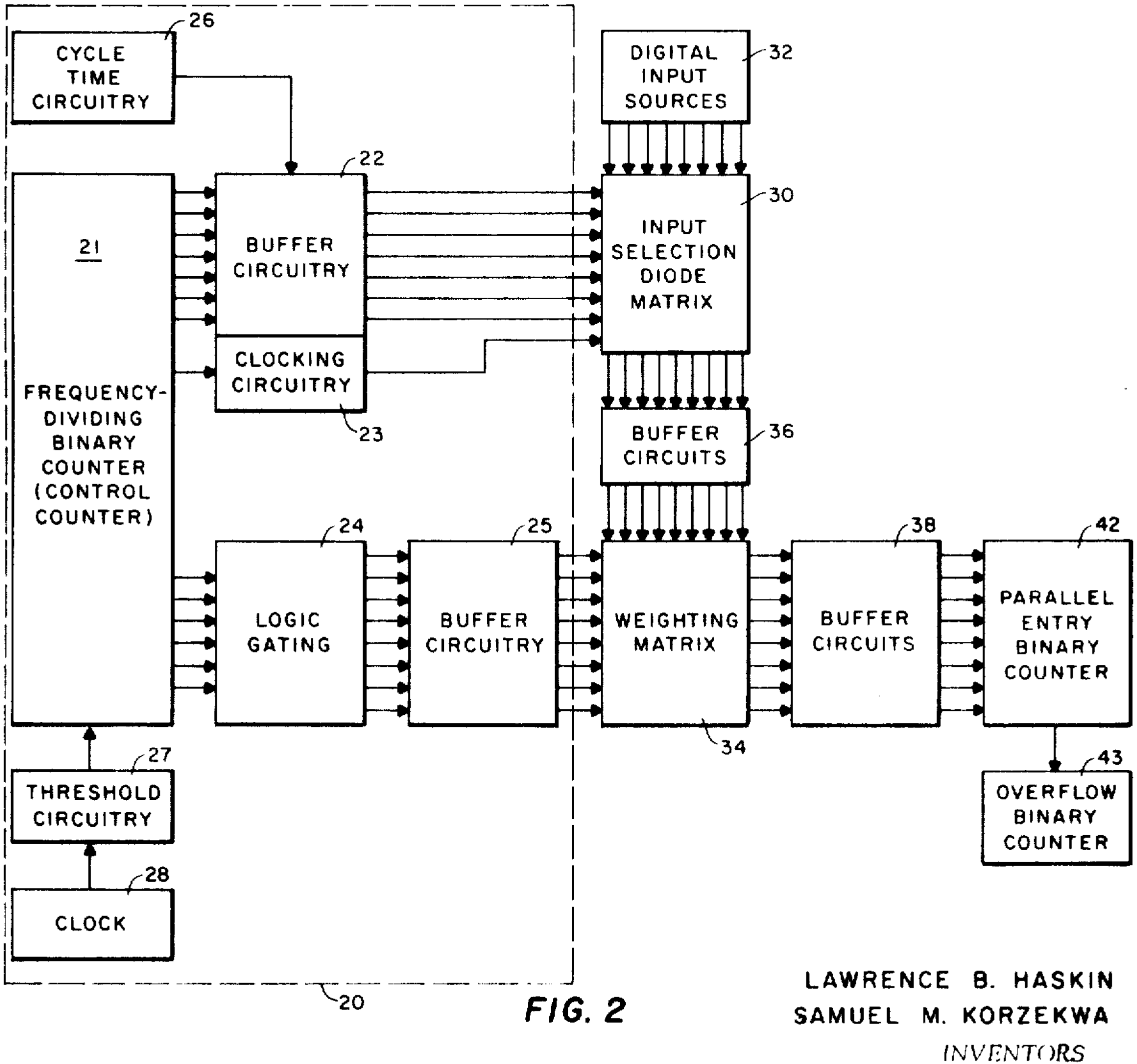
FIG. 2 is a block diagram of the general system of the present invention.

The general system of this invention is presented in block diagram form in FIG. 2 for providing a completely digital system which selectively scans a large number of digital inputs. Whenever a sampled input is present, i.e., it is in the "up," or logic "1," state, then it is given a weight and its occurrence recorded with proper emphasis, relative to the occurrence of other inputs, as determined by the assigned weight. Thus, regardless of amplitude and time duration variations, the relative occurrence of particular inputs can be gaged by heavily weighting them and examining the sum of the weighted contributions of all the inputs over a given sampling period. Performance of particular operations are assigned to specific sections in the block diagram of the system shown in FIG. 2. The frequency divider counter 21 and associated circuitry 22–28 enclosed by dashed line 20 provide the scanning rate and clocking for the complete system. The input selection matrix 30 is actually a standard diode matrix which successively allows particular inputs from digital input sources 32 to be transmitted on to the weighting matrix 34 via buffer circuits 36 while inhibiting all other inputs. It is important to note that if the scanning of the inputs takes place at a much slower speed than the weighting and counting operation, then a full cycle in the weighting operation can be completed during the time in which the input selection diode matrix 30 scans a single input. On the other hand, all the inputs can be completely scanned as each individual "weight" is applied merely by reversing the relative cycle speeds of the two operations by cycle time circuitry 26. Matrix 30 can also be clocked by clocked circuitry 23 in order to prevent erase conditions in later processing.

Figures 3, 4:
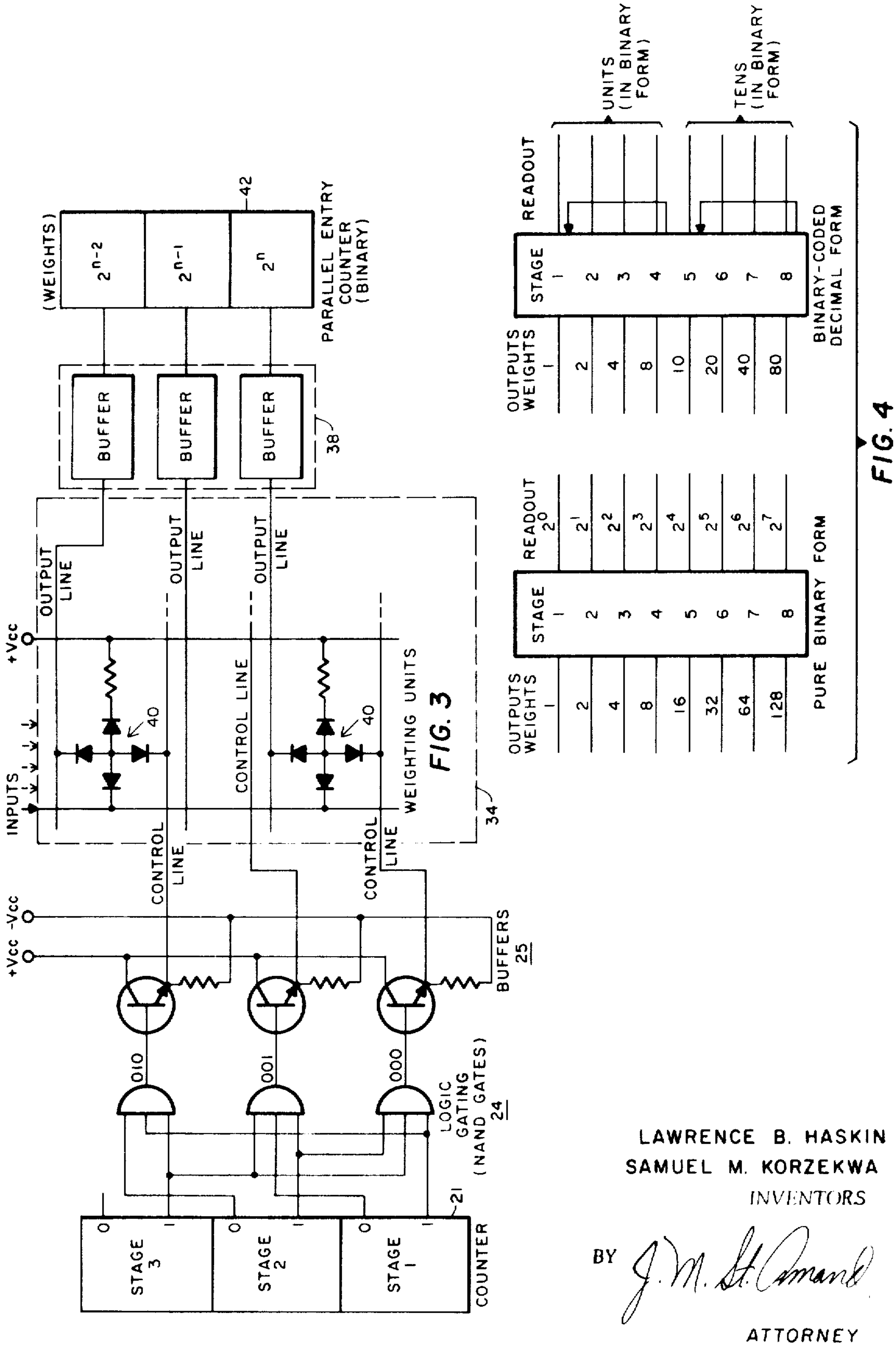
FIG. 3 shows a weighting matrix circuit and associated circuitry.
FIG. 4 shows a pure binary form and a binary-coded decimal form of weighting schemes.

To accomplish the weighting of a particular input, a matrix 34 of AND-OR gates is used. FIG. 3 shows the construction of such a matrix where logic gating 24 (i.e. NAND gates) perform an inverting AND function. Thus, a pulse appears sequentially on the control lines beginning with the first or 000 line because the AND gates are essentially detecting the occurrence of binary members. The weighting units 40 in weighting matrix 34 are a type of gate which perform a combination AND-OR function. It is important to note that a pulse appears on an output line only when both the input and the control line pulse are present. For simplicity, only one input line and three control lines are shown in FIG. 3. Consider the following observations which are easily made from the example illustrated in FIG. 3.

First: If the input does not happen to be present, then no pulses will be sent to Parallel Entry Counter 42.

Second: If the input is present, only the $2^{n}$ and $2^{n'7\varepsilon'2}$ stages of Parallel Entry Counter 42 will be triggered. Thus, an effective weight of $2^{n}+2^{n'7\varepsilon'2}$ has been assigned to the particular input considered.

In practice, there will be many inputs and many control lines, thus forming a matrix. If, for example, the first three stages of the Control Counter 21 are completely utilized, then the logic gating 24 will generate eight successive control pulses corresponding to the binary number 000 thru 111. Thus, any input could be weighted by an integer amount between 0 and 255 (or $2^{N}$ possible weights). Note that the output lines must terminate into binary counter of counter 42 in order to realize integer resolution. However, the weighting need not be confined to pure binary form. For example, the eight outputs could be coded in the familiar 8–4–2–1, binary-coded decimal form. Thus, by appropriate interpretation, a decimal readout can be obtained.

There are many possible applications where such a digital operation is useful. One major area is that of sampled statistical data systems. A system has already been implemented to process digital pulses generated by the threshold sampling of sonic signals. This system handles up to 32 inputs and has a weighting resolution of 127 to 1. Due to the completely digital nature of the operation, it was possible to build the entire system with relatively low cost, low-power components including integrated circuits.

The only major constraints on the capacity of the system are primarily the various counting capabilities and the loading of the buffer circuits. Thus, the capacity of the system can be easily enlarged by increasing the capability of a few key sections.

The Buffer Circuitry 22 consists of power amplifying binary logic elements. The loading effect of diode matrix 30 could drastically impair the operation of control counter 21 if buffer elements were not inserted into the control signal lines. The Logic Gating 24 consists of multiinput logic gates which, by proper logic design, utilize the control counter 21 signals to generate sequential control signals for multiplexing the weighting matrix 34 operations.

Buffer circuitry 25 consists of power amplifying, emitter follower circuits. Because the inputs are from logic elements 24, the outputs will also be binary logic signals but have sufficient drive capability to operate the weighting matrix 34 functions. In general, a number of weighting units along a given control line, as shown in FIG. 3, are controlled by a single buffer stage of buffer circuitry 25.

The Cycle Time Circuitry 26 consists primarily of a flip-flop. The input is, in general, a square wave having a frequency equal to the processing cycle rate or a multiple of it. The flip-flop is connected in a latching mode such that when the proper number of operations have been completed and the input changes state, the flip-flop output changes state and is locked in that state until a new sequence is initiated. Thus, at the end of the desired number of operations, the cycle control switches to a state that inhibits further system operation.

The Threshold circuitry 27 is required in order to convert the master signal sine wave into a square wave. A signal with sharp transitions is required as input to the binary control counter. A type of Schmitt trigger circuit could be used, but in this case, a simple buffer element was used. This element acts as a high-gain limiter on the input and thus converts the sine wave to a square wave with sufficiently sharp rise and fall times to drive the binary counter 21 input.

Clock 28 circuit is used to create a master timing signal from which all sampling and other timing operations are derived. Thus, the master signal must have a stable high frequency to allow these derivations. Because of the high frequency requirement, a crystal-controlled circuit using discrete components is used. A circuit using integrated circuits could also be used.

Parallel Entry Binary Counter 42 accumulates the results of the weighting operation of weighting matrix 34. A pulse at the input of the $n^{th}$ stage will effectively add a count of $2^{(n-1)}$ into the counter regardless of the output state of the preceding stage in the counter. The speed and direction of multiplexing the inputs is important in avoiding ripple-carry erase conditions. A counter of this type is easily implemented by using standard integrated circuit logic. Overflow Binary Counter 43 is a simple ripple-carry counter which extends the capacity of the parallel entry binary counter 42. For this function, the parallel entry feature is not needed and thus a more simple configuration is sufficient.

What is claimed is:

1. A completely digital weighting multiplexer system with memory comprising:
   a. frequency dividing means including counter means for providing system scanning rate and clocking and first and second buffer circuitry means,
   b. an input selection matrix means to which digital input sources are fed, said input selection matrix means being connected to the output of said frequency dividing and counter means via said first buffer circuitry means, said first buffer circuitry means comprising power amplifying logic elements to prevent the loading effect of said input selection matrix means from impairing the operation of said frequency dividing means,
   c. a weighting matrix means comprising a matrix of combination AND-OR function gates, a pulse appearing on an output from said weighting matrix means only when both an input pulse from said input selection matrix means and a control pulse from said frequency dividing means via said second buffer circuitry means are present at one of said combination AND-OR function gates,
   d. said input selection matrix means successively allowing only selective inputs from digital input sources to be transmitted to said weighting matrix means while inhibiting all other inputs,
   e. said frequency dividing means including logic gating means for providing control pulses to said weighting matrix via said second buffer circuitry means which consists of power amplifying emitter follower circuits,
   f. a parallel entry counter means,
   g. outputs from said weighting matrix means being fed to said parallel entry counter means to realize integer resolution, the relative occurrence of selective inputs being gaged by heavily weighting them and examining the sum of all the weighted inputs over a given sampling period regardless of amplitude and time duration variation of the inputs.

2. A system as in claim 1 wherein said input selection matrix comprises a standard diode matrix.

* * * * *